Figure 1:
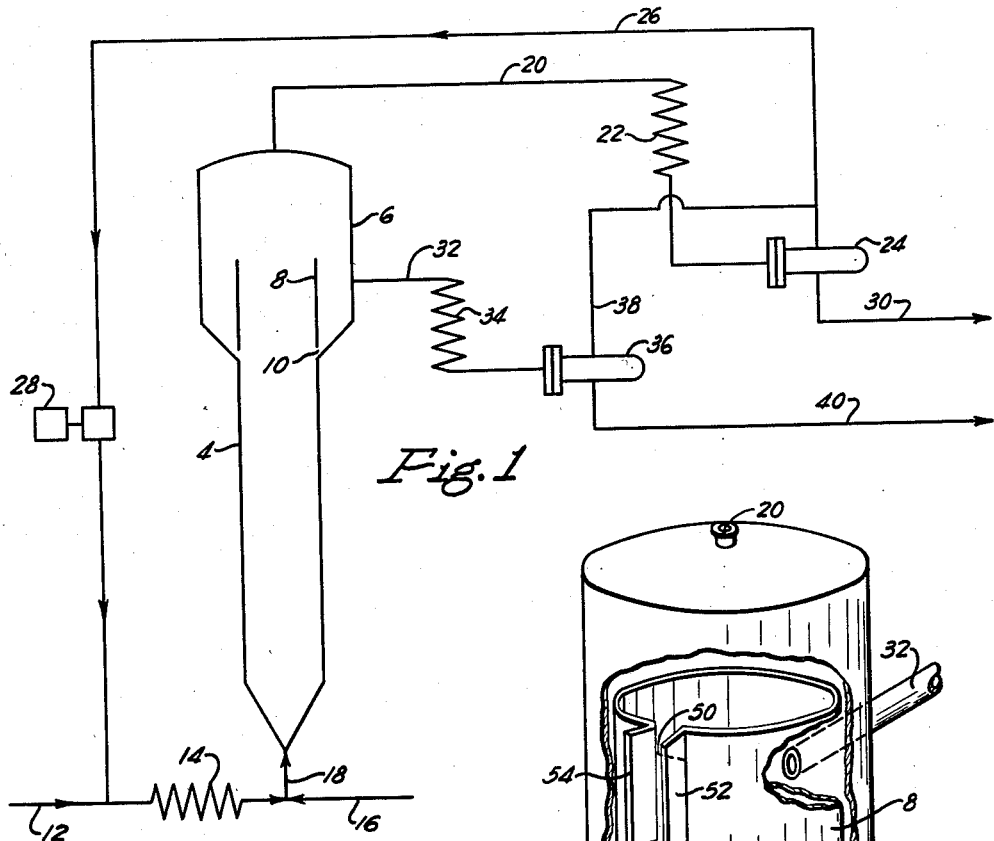

INVENTOR.
JERRY McAFEE

BY

HIS ATTORNEY

United States Patent Office 2,944,961
Patented July 12, 1960

2,944,961

DESTRUCTIVE HYDROGENATION PROCESS AND APPARATUS

Jerry McAfee, Oakmont, Pa., assignor to Gulf Research & Development Company, Pittsburgh, Pa., a corporation of Delaware Filed Mar. 4, 1957, Ser. No. 643,740

5 Claims. (Cl. 208—108)

This invention relates to improved procedure for treatment of hydrocarbons with hydrogen and in particular to destructive hydrogenation of high boiling hydrocarbons under moderate pressure conditions.

The prior art describes procedure in which high boiling hydrocarbons are subjected to destructive hydrogenation while in liquid phase, said liquid phase containing particles of a solid hydrogenation catalyst suspended therein. This process operates effectively when high pressures such as above 3000 p.s.i.g. are used. I have applied this process to high boiling hydrocarbons containing a relatively large amount of tar-forming materials, such as asphaltic materials, and have found that it is not entirely satisfactory in connection with such materials when moderate pressures such as between about 300 and 3000 p.s.i.g. are employed. Under these moderate pressure conditions the high boiling hydrocarbon and/or asphaltic materials present form refractory tars which cannot be converted and these tars tend to accumulate in the reactor, necessitating termination of the process.

This invention has for its object the provision of improved procedure for carrying out the moderate pressure hydrogen treatment of high boiling hydrocarbons which contain tar-forming materials. Another object is to provide procedure whereby high boiling hydrocarbons containing tar-forming materials can be converted under moderate pressure conditions in the presence of a suspended hydrogenation catalyst without termination of the process to remove tar-like materials. Another object is to provide improved procedure for carrying out moderate pressure destructive hydrogenation of high boiling hydrocarbons whereby catalyst particles suspended in unconverted tar-like materials may be separated in the reaction system and the separated catalyst re-used and the tar-like material removed from the system. Another object is to provide improved apparatus for carrying out destructive hydrogenation of high boiling materials under moderate pressure conditions in the presence of a slurry of hydrogenation catalyst. Other objects of my invention will appear hereinafter.

These and other objects are accomplished by my invention which includes subjecting a high boiling hydrocarbon which contains asphaltic materials which form relatively refractory tars to the action of hydrogen while in liquid form and while in the presence of a finely divided hydrogenation catalyst suspended therein. The liquid body of high boiling hydrocarbon is maintained at destructive hydrogenation temperatures and moderately elevated pressures. Hydrogen and fresh high boiling hydrocarbon are added to the liquid body undergoing reaction. Unreacted hydrogen and vaporous hydrocarbon reaction products are removed overhead from the liquid body. A portion of the liquid body is continuously removed to a settling chamber which is maintained under substantially said temperature and pressure. The catalyst particles are settled in the removed liquid to form a lower layer containing a high concentration of the catalyst particles. The high concentration layer is returned to the liquid body undergoing reaction while the upper layer constituting primarily tar-like material is removed from the system.

My invention also includes apparatus for carrying out catalytic conversion of a liquid such as a high boiling hydrocarbon, said apparatus constituting a cylindrical reactor divided into concentric reaction and settling compartments, the settling compartment being positioned near the upper part of the reacting compartment and providing a quiescent passageway in which catalyst suspended in the liquid flowing through the settling compartment is caused to separate from the liquid by gravitational force. My improved apparatus also includes means whereby liquid present in the upper part of the reaction compartment overflows into the upper part of the settling chamber, means for returning the concentrated catalyst from the settling chamber to the reaction chamber and means for removing an upper liquid layer from the settling chamber which upper liquid layer contains less catalyst than is present in the lower portion of the settling chamber.

In the following description and examples I have set forth several of the preferred embodiments of my invention, but it is to be understood that they are given by way of illustration and not in limitation thereof.

Figure 2:
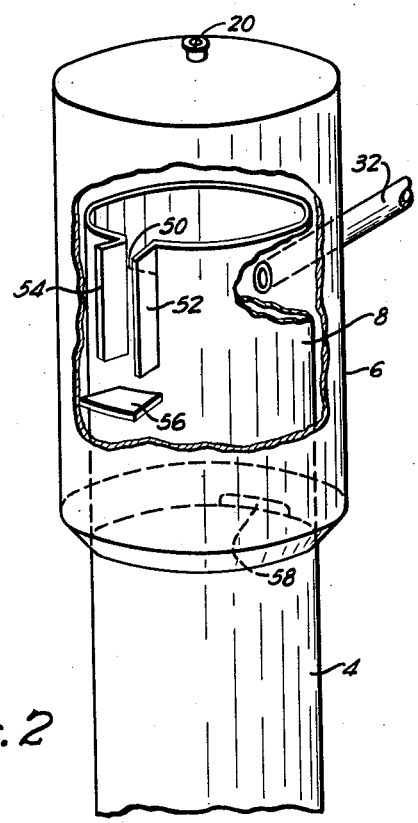

In the accompanying drawings Figure 1 is an elevation partly in section of a complete diagrammatic system for carrying out the destructive hydrogenation of a high boiling hydrocarbon in accordance with my invention and Figure 2 is an isomeric elevation partly in section of a modification of the reactor portion of the apparatus illustrated in Figure 1.

Referring to Figure 1, numeral 4 designates a cylindrical reactor, the upper portion of which is enlarged so that it has a greater diameter than the lower portion as indicated by numeral 6. Numeral 8 designates a cylindrical partition positioned concentrically within upper portion 6 of the reactor and numeral 10 designates openings at the base of partition 8, i.e. between the base of partition 8 and reactor 4. Numeral 12 designates a conduit for introducing hydrogen into the base of reactor 4 after passage through heater 14. Numeral 16 designates a conduit for introducing a high boiling hydrocarbon liquid into the base of reactor 4 together with hydrogen, the mixture of hydrogen and hydrocarbon passing through conduit 18 and thence into the base of the reactor. Numeral 20 designates a conduit for removing vaporous reaction products and hydrogen from the top of the reactor 4, this mixture being cooled in condenser 22 and separated in high pressure separator 24 into hydrogen and liquid reaction products. The hydrogen is recycled through conduit 26 and compressor 28 while the liquid reaction products are removed from the high pressure system through conduit 30. Numeral 32 designates a conduit communicating with the annular space between elements 6 and 8. Conduit 32 is positioned between the upper and lower limits of this annular space. Conduit 32 serves to withdraw a liquid from this annular space which liquid is cooled in cooler 34 and separated in high pressure separator 36 into hydrogen which is recycled through conduit 38 and into a tar-like product which is removed from the system through conduit 40.

In operating the apparatus illustrated in Figure 1, hydrogen is introduced under reaction pressure through conduit 12. Recycle hydrogen from compressor 28 is also mixed with this fresh hydrogen. The hydrogen is heated to about or above reaction temperature in preheater 14 and is mixed with heated high boiling hydrocarbon charge stock introduced under reaction pressure through conduit 16 so that the mixture is about at reaction temperature. This mixture flows into the base of reactor 4 through conduit 18. In the initial stages of the reaction, the charge stock introduced through conduit 16 will contain a finely divided hydrogenation catalyst suspended therein. This catalyst will be added to the charge stock until the desired amount of catalyst has been introduced into reactor 4. Thereafter hydrogenation catalyst will be added to the charge stock only when it is necessary to replace catalyst which might be removed in small amounts from the reactor via conduit 32.

The reaction between the hydrogen and hydrocarbon is exothermic, therefore it is unnecessary to supply the heat of reaction as sensible heat in the feed. The hydrogen will pass upwardly through the hydrocarbon liquid in the reactor and during such passage the hydrocarbon liquid to a large extent will be converted into lower boiling hydrocarbons. The unreacted hydrogen and lower boiling hydrocarbons will be removed through conduit 20, cooled in condenser 22, and separated in separator 24. The hydrogen will be recycled through conduit 26. The liquid reaction products in separator 24 are removed through conduit 30.

As the reaction proceeds, refractory tar-like materials will accumulate in reactor 4. Since these materials are converted into lower boiling hydrocarbons only with extended treatment, their removal is desirable. At the same time it is undesirable to remove the catalyst particles since these catalyst particles still have high activity. Furthermore if the catalyst particles are removed with the tar and the tar is cooled, the separation of the catalyst particles is a very difficult problem due to the high viscosity of the tar. This separation is conveniently accomplished in accordance with my invention by means of the annular settling chamber between elements 6 and 8. The level of the liquid in the reactor is preferably just above the top of partition 8. Therefore liquid is present in the annular space between elements 6 and 8. The liquid flows into the upper part of the annular space. This liquid flowing into the space contains suspended catalyst particles. However, the liquid in the annular space between elements 6 and 8 is quiescent, i.e. it is protected from the agitating action of the up-flowing hydrogen gas in reactor 4. Therefore the catalyst particles settle by gravity and the settled particles together with some of the liquid are returned to the reactor through opening 10. A tar containing relatively little or no catalyst is removed through conduit 32, is cooled in cooler 34 and is separated in 36 into tar which is removed through conduit 40 and hydrogen which is recycled via conduits 38 and 26.

Referring to Figure 2, numeral 50 designates a weir through which the liquid and suspended catalyst flow from the central portion of reactor 4 into the settling chamber. Numerals 52 and 54 designate vertical baffles positioned on each side of weir 50 and serve to direct the liquid flowing therethrough against a third baffle 56 which is approximately horizontal. Baffle 56 directs the down-flowing liquid sideways around each side of the annular space between elements 6 and 8. Numeral 58 designates an opening in the bottom of the settling space through which the catalyst flows back to reactor 4. Conduit 32 and opening 58 are preferably positioned on the same side of the settling space and on a side opposite from the opening 50.

The modification in Figure 2 is designed to give improved separation of suspended catalyst from the tar by causing the settling liquid to take an indirect or longer path through the settling chamber. This gives greater settling time and also more uniform settling. During the operation of the apparatus of Figure 2 the tar or unconverted high boiling hydrocarbon overflows opening 50, thence passes downward between baffles 52 and 54 and then is directed to each side of baffle 56. The liquid then passes around each side of the annular space before reaching opening 58. The liquid reaching the side of the annular space above opening 58 will have a smaller amount of catalyst in the upper layer thereof. It is for this reason that withdrawal conduit 32 is positioned on the opposite side from overflow 50.

My invention may be employed to treat any high boiling hydrocarbon which contains materials which form tar-like refractory products during destructive hydrogenation under moderate pressures. My invention is particularly applicable to the treatment of crude petroleum, reduced crude, topped crude or other petroleum fractions containing large amounts of asphaltic materials. My invention is also applicable to the treatment of shale oil and tars such as those derived from tar sands. Many of these high boiling materials contain asphaltic materials and sulfur compounds. The hydrogen treatment results in conversion of a large portion of the asphalts to lower boiling hydrocarbons and also results in extensive desulfurization of both the lower boiling products and the tar-like products.

Pressures of between about 300 and 3000 p.s.i.g. may be employed. Pressures of about 500 to 1000 are particularly advantageous since they give extensive conversion and do not involve the cost of higher pressure equipment. Temperatures of between about 750° and 925° F. may be used and I prefer to employ temperatures between about 775° and 875° F. A hydrogen recycle rate of between about 300 and 20,000 standard cubic feet of hydrogen per barrel of charge stock may be employed. I prefer to employ a hydrogen recycle rate of between about 2000 and 10,000 standard cubic feet per barrel.

Any hydrogenation catalyst may be employed. However, I prefer to employ catalysts which exhibit both a hydrogenation and a cracking activity. Examples of suitable catalysts are iron group metals or their oxides, tungsten, vanadium or molybdenum oxides or combinations thereof such as a combination of nickel and tungsten oxides. I prefer to employ catalysts which are deposited upon porous carriers such as activated alumina, pumice, activated alumina stabilized with a small amount of silica or catalytic cracking catalysts such as silica-alumina cracking catalysts. The latter carrier should preferably be treated with steam to lower its cracking activity before utilization as a carrier. The amount of catalyst which should be maintained suspended in the liquid undergoing reaction can vary between about 3 percent and 30 percent. The catalyst particles should be large enough to readily settle out of the liquid but small enough so that they will be suspended in the high boiling hydrocarbon. A particle size of between about 54 and 180 microns may in general be used.

EXAMPLE

Baxterville crude having the inspection shown in Table I is preheated to 815° F. and charged into the base of a reactor similar to that illustrated in Figure 1. The charge stock contains 4.3 pounds of catalyst per barrel of charge. The diameter of the reactor is 8 feet and the upper diameter in the settling section is 10 feet. The height of the liquid level in the central or reaction section is about 1 foot higher than the level of the liquid in the annular settling space. The reactor contains 27,100 pounds of catalyst having a mesh size of between 100 and 325. The catalyst is red mud, the composition of which is given in Table II. Hydrogen heated to 815° F. is also introduced into the base of the reactor at the rate of 12,000 s.c.f./bbl. of charge. The space velocity (vol. of oil per hour per vol. of slurry in reactor) is 2; the reaction temperature 815° F.; and the reaction pressure 1000 p.s.i.g. Tar containing 17 pounds of catalyst fines per barrel of tar is removed from the upper settling chamber outlet (positioned 27 feet above the base of the reactor) at the rate of 150 barrels per hour. This operation is continuous and yields tar and overhead products having the characteristics given in Table III.

Table I

| | |
|---|---|
| Gravity, ° API | 15.1 |
| Sp. gr., 60°/60° F. | 0.9652 |
| Viscosity, cs., sec., 100° F. | 822.7 |
| Sulfur, Braum-Shell, percent | 2.92 |
| Water and sediment, percent ASTM D 96 | 0.2 |
| Carbon residue, Conradson, percent | 13.94 |
| Distillation, ASTM D 158: | |
|   Over point, ° F. | [1] 304 |
|   End | --- |
|   Percent at—392° F. | 0.1 |
|           500° F. | 5.6 |
|           590° F. | 16.0 |
|   10% at ° F. | 510 |
|   20% | 598 |
|   30% | 679 |
|   40% | 771 |
|   50% | 856 |
|   60% | 949 |
|   70% | 993 |
|   80% | <1000 |

[1] Vacuum corrected to 760 mm. Hg.

Table II

| | |
|---|---|
| Analysis, percent by wt.: | |
|   Ignition loss | 8.3 |
|   $SiO_2$ | 16.5 |
|   $Fe_2O_3$ | 17.4 |
|   $Al_2O_3$ | 24.0 |
|   $TiO_2$ | 6.4 |
|   CaO | 12.7 |
|   MgO | 1.0 |
|   $MnO_2$ | 0.2 |
|   $Na_2O$ | 9.6 |
|   $SO_3$ | 1.9 |
| Surface area of material calcined at 1000° F., m.²/g. | 19.6 |
| Apparent density of packed 1000° F. calcined catalyst, g./ml. | 0.911 |

Table III

| | |
|---|---|
| Recovery, percent by wt.: | |
|   Gas, $C_1$–$C_3$ | 2.1 |
|   Overhead product | 69.6 |
|   Tar product | } 28.3 |
|   Coke | |
|   Sulfur eliminated | 1.2 |
|     Total | 101.2 |
| Product inspections: | |
|   Overhead product— | |
|     Gravity, ° API | 30.0 |
|     Sp. gr., 60°/60° F. | 0.8762 |
|     Sulfur, Braun-Shell, percent | 1.64 |
|     Carbon residue, Conradson, percent, on 590° F. bottoms | 0.22 |
|     Distillation, gas oil, ASTM D 158: | |
|       Percent at 392° F. | 10.8 |
|       Percent at 500° F. | 25.2 |
|       Percent at 590° F. | 45.2 |
| Tar Product: | |
|   Sp. gr., 210°/60° F. | 1.125 |
|   Viscosity, Furol, sec., 210° F. | 4502 |
|   Sulfur, B, percent | 3.78 |
|   Carbon residue, Conradson, percent | 30.7 |
|   Insoluble in n-pentane, percent, ASTM D 893 | 38.1 |
|   Insoluble in benzene, percent, ASTM D 893 | 6.0 |

I claim:

1. A process for catalytically converting a high boiling hydrocarbon which contains asphaltic material which process comprises establishing a liquid body of the high boiling hydrocarbon and suspended finely divided catalyst under destructive hydrogenation conditions, continuously introducing fresh high boiling hydrocarbon and hydrogen into the body of liquid suspension, continuously removing vaporous conversion products from above the top of the body of liquid suspension, continuously flowing a side stream of the body of liquid and suspended catalyst from the top of the body of liquid suspension into a quiescent settling zone, preventing agitation in the settling zone by hydrogen and hydrocarbon vapors flowing through the liquid body undergoing catalytic conversion, settling the removed liquid under reaction conditions to form a portion having a high concentration of finely divided catalyst and a portion containing substantially only liquid, removing from the system at least part of the portion containing only liquid and returning the portion containing the catalyst to the body of liquid undergoing catalytic conversion.

2. The process for destructive hydrogenation of a high boiling hydrocarbon which contains asphaltic materials which form relatively refractory tars said process comprising establishing a liquid body of the high boiling hydrocarbon which liquid body contains finely divided particles of a hydrogenation catalyst suspended therein, maintaining the liquid body at destructive hydrogenation temperature and pressure, continuously introducing hydrogen and fresh high boiling hydrocarbon charge into the liquid body of high boiling hydrocarbon, continuously removing overhead unreacted hydrogen and vaporous hydrocarbon reaction products without a substantial amount of the liquid, continuously removing a portion of the liquid containing suspended catalyst particles from the liquid body, introducing this removed liquid into a settling chamber surrounding the upper part of said liquid body and maintained under substantially said destructive hydrogenation temperature and pressure, preventing agitation of the liquid in the settling chamber by hydrogen and hydrocarbon vapors flowing through the liquid body undergoing catalytic conversion, settling finely divided particles of hydrogenation catalyst from the removed portion of liquid to form a high concentration of catalyst particles in the lower portion of the removed liquid, returning the high concentration of catalyst particles to the liquid body and withdrawing the upper portion of the removed liquid from the reactor.

3. Destructive hydrogenation apparatus comprising in combination a cylindrical high pressure reactor adapted to hold, during operation, a body of liquid hydrocarbon and suspended catalyst in a cylindrical reaction zone, means for introducing liquid hydrocarbon and hydrogen into the reaction zone, means for removing vapor and hydrogen from the top of the reactor, a cylindrical partition positioned concentrically in the reactor and intermediate the lower and upper ends thereof so as to form an annular settling chamber between the wall of said partition and the upper wall of the high pressure reactor and positioned so that liquid undergoing reaction will overflow from the upper portion of the reaction chamber across the top of the cylindrical partition and into the upper part of the annular settling chamber, means for introducing liquid and suspended catalyst from the bottom of the annular settling chamber into the reaction zone and means for removing liquid from the top of the annular settling chamber.

4. Destructive hydrogenation apparatus comprising in combination a high pressure cylindrical reactor divided into a central reaction compartment and a settling compartment surrounding the upper part of the reaction compartment and being concentric therewith, said central reaction compartment and surrounding settling compartment being separated by a cylindrical partition so positioned that liquid present in the reaction compartment during operation flows over the top of the partition from the upper portion of the central reaction compartment into the upper portion of the surrounding settling compartment, baffles forming a quiescent passageway in the settling compartment so that catalyst suspended in the liquid flowing through the settling compartment is caused to separate from the liquid by gravitational force, means whereby settled catalyst in the lower portion of the settling compartment is caused to flow back into the reaction compartment, a conduit communicating with the upper part of the settling compartment for removing liquid relatively free of suspended catalyst, means for continuously introducing liquid reactant into the lower portion of the reaction compartment and means for removing converted vapors from the upper part of the high pressure cylindrical reactor.

5. Destructive hydrogenation apparatus comprising in combination a cylindrical high pressure reactor adapted to hold, during operation, a body of liquid and suspended catalyst in a cylindrical reaction zone, means for introducing reactant liquid and hydrogen into the lower part of the reaction zone, means for removing vapor and hydrogen from the top of the reaction zone, a cylindrical partition positioned concentrically with the upper part of the cylindrical reactor, said partition forming an annular settling chamber surrounding the upper part of the reaction zone, means for introducing reacted liquid and suspended catalyst into the central portion of the annular settling zone, means for imparting tangential flow of the liquid introduced into the annular settling chamber, means for returning liquid and catalyst from the bottom of the settling chamber to the reaction zone, said means being positioned on a side of the annular settling chamber opposite from that through which the liquid is introduced into the settling zone and means for removing liquid from the annular settling chamber, said means being positioned near the top of the settling chamber and on that side of the settling chamber opposite from that into which the liquid is introduced therein.

References Cited in the file of this patent

UNITED STATES PATENTS

| | | |
|---|---|---|
| 2,688,588 | Beam | Sept. 7, 1954 |
| 2,706,167 | Harper et al. | Apr. 12, 1955 |
| 2,756,188 | Kaulakis | July 24, 1956 |
| 2,761,820 | Snuggs et al. | Sept. 4, 1956 |
| 2,873,247 | Borey | Feb. 10, 1959 |

UNITED STATES PATENT OFFICE
CERTIFICATE OF CORRECTION

Patent No. 2,944,961 July 12, 1960

Jerry McAfee

It is hereby certified that error appears in the printed specification of the above numbered patent requiring correction and that the said Letters Patent should read as corrected below.

Column 2, line 31, for "isomeric" read -- isometric --; column 5, line 62, for "45.2" read -- 45.5 --.

Signed and sealed this 4th day of April 1961.

(SEAL)
Attest: ERNEST W. SWIDER
Attesting Officer

ARTHUR W. CROCKER
Acting Commissioner of Patents